United States Patent [19]

Fujie et al.

[11] Patent Number: 4,644,013

[45] Date of Patent: Feb. 17, 1987

[54] PREPARATION OF FOAM PARTICLES OF ETHYLENIC RESIN AND FOAM MOLDINGS PREPARED THEREFROM

[75] Inventors: Akira Fujie; Tsukasa Yamagishi, both of Suzuka, Japan

[73] Assignee: Asahi Kasei Kogyo Kabushiki Kaisha, Osaka, Japan

[21] Appl. No.: 597,714

[22] Filed: Apr. 6, 1984

[30] Foreign Application Priority Data

Apr. 8, 1983 [JP] Japan .................................. 58-61582
Apr. 11, 1983 [JP] Japan .................................. 58-63299
Jul. 14, 1983 [JP] Japan ................................ 58-126940

[51] Int. Cl.$^4$ .............................. C08J 9/16; C08J 9/18
[52] U.S. Cl. ........................................ 521/60; 521/56; 521/58; 521/143; 521/144
[58] Field of Search ................... 521/56, 60, 143, 144

[56] References Cited

U.S. PATENT DOCUMENTS

| 4,379,859 | 4/1983 | Hirosawa et al. | 521/59 |
| 4,399,087 | 8/1983 | Akiyama et al. | 521/53 |
| 4,415,680 | 11/1983 | Ushirokawa et al. | 521/56 |
| 4,436,840 | 3/1984 | Akiyama et al. | 521/58 |
| 4,443,393 | 4/1984 | Akiyama et al. | 521/58 |
| 4,448,901 | 5/1984 | Senda et al. | 521/60 |
| 4,464,484 | 8/1984 | Yoshimura et al. | 521/58 |
| 4,504,601 | 3/1985 | Kuwabara et al. | 521/58 |

FOREIGN PATENT DOCUMENTS

| 1133883 | 10/1982 | Canada | 252/52 F |
| 2107683 | 8/1972 | Fed. Rep. of Germany . | |
| 111837 | 4/1983 | Japan . | |

Primary Examiner—Morton Foelak
Attorney, Agent, or Firm—Birch, Stewart, Kolasch & Birch

[57] ABSTRACT

The present disclosure is directed to foam particles of a linear, uncrosslinked ethylenic resin which can be expansion molded by heating in its uncrosslinked state. The present disclosure is also concerned with a process for preparing foam particles of a linear uncrosslinked ethylenic resin and a process for the in-mold foam molding of said resin particles.

9 Claims, 10 Drawing Figures

PREPARATION OF FOAM PARTICLES OF ETHYLENIC RESIN AND FOAM MOLDINGS PREPARED THEREFROM

BACKGROUND OF THE INVENTION

1. Field of the Invention

The present invention relates to foam particles of an uncrosslinked linear ethylenic resin, which have heretofore been deemed to be practically not realizable, and foam moldings prepared therefrom and methods for their preparation. More particularly, the present invention pertains to foam particles of a linear ethylenic resin which can be expansion molded by heating in an uncrosslinked state and from moldings prepared therefrom, said resin being a specific linear ethylenic resin capable of providing in-mold foam moldings which are novel and useful and possess excellent properties when compared with in-mold foam moldings of crosslinked polyethylene resins prepared by the process of the prior art.

2. Description of the Prior Art

As is well known in the art, foam moldings with complicated shapes corresponding to the shape of certain mold cavities can be produced according to a prior art process which comprises filling the mold cavity with foam particles of a synthetic resin, permitting these particles to expand thereby filling the gaps formed between adjacent particles, and simultaneously effecting close fusion between the mutually expanded particles. This process has been developed for the expansion molding of a polystyrene resin, and has been effective in the production of in-mold foam moldings of polystyrene.

However, when such a process is applied to uncrosslinked polyethylene as a substitute for the polystyrene base resin, satisfactory foam molding could not be obtained. The problem may be inherent in polyethylene resins, namely poor retentivity by the resin film of the gases generated from the blowing agent on melting (namely gas barrier characteristic) on one hand, and marked variation in the visco-elastic changes of said resin as a function of the temperature, on the other. Thus it has been very difficult to determine adequate expansion conditions for the resin.

Accordingly, in processes for producing in-mold expanded moldings of polyethylene resins, it has been proposed to use crosslinked polyethylene as the base resin through the use of a chemical crosslinking agent or radiation in order to modify the properties inherent in uncrosslinked polyethylene resin, and developments in this direction have progressed rapidly in recent years. For example, developments have been made in the processes for the preparation of foam particles or in-mold foam moldings of polyethylene resins capable of producing molding having surface smoothness and luster comparable to the in-mold foam moldings of polystyrene (see Japanese Laid-open Patent Publications Nos. 14632/1982 and 70621/1982).

These techniques concerning the in-mold expansion molding of polyethylene resins have been developed on the basis of expanding the resin used as the base material in a crosslinked state. These crosslinking techniques have been known and frequently used, primarily as means for modifying the properties of the resin mainly because they have the advantage of not impairing the properties inherent in ethylene resin as compared with means for modifying the properties of said resin in which other resin components such as polystyrene or ethylene vinyl acetate are permitted to co-exist through copolymerization or mixing.

However, the step of crosslinking polyethylene is an additional step which increases the overall cost of the process, such as installation cost or energy cost. Another disadvantage in using a crosslinked foam molding is that it cannot be regenerated and returned to its original state for reuse. Because of the demands to conserve energy and resources, it is desired to develop a technique for the in-mold expansion molding of polyethylene which omits the crosslinking step. Furthermore, the in-mold expansion molding of crosslinked polyethylene of the prior art has not been satisfactory with respect to retaining the heat resistance and adiabatic performance of the resin, or the dimensional stability and rigidity of the resin at a high degree of expansion.

SUMMARY OF THE INVENTION

In view of the state of the art as described above, the present inventors have made extensive studies with the object of developing the in-mold expansion molding of an ethylene resin, which obviates the crosslinking step, while at the same time producing an excellent fused structure of the expanded particles within the molding over a wide range of density regions which possess desirable retentivity properties with a lapse of time, and advantageous heat resistant properties and adiabatic performance, such as heat resistant creep, heat resistant deterioration, heat resistant shrinking, and the like. The above objects were accomplished by utilizing an uncrosslinked expansion molding prepared from foam particles of a linear, uncrosslinked ethylenic resin having a specific weight average molecular weight/number average molecular weight ratio and a specific density, said expansion molding having a density which has a specific relationship to the stress required for 25% compression of the molding. The present invention has been accomplished on the basis of such a finding.

More specifically, the present invention provides foam particles of a linear ethylene resin which can be expansion molded by heating in a uncrosslinked state, which comprises using a linear ethylenic resin as the base resin having a molecular weight distribution of 15 or higher in terms of the ratio $\overline{Mw}/\overline{Mn}$, that is, the ratio of the weight average molecular weight ($\overline{Mw}$) to the number average molecular weight ($\overline{Mn}$) as measured by gel permeation chromatography, having a bimodal wave form in the curve of molecular weight distribution, and having a weight average molecular weight of $2 \times 10^5$ or higher and a density of 0.920 g/cm$^3$ or higher, the linear ethylenic resin particularly being selected from the group consisting of a high density polyethylene, a linear low density polyethylene produced by low and medium pressure methods and a linear crystalline copolymer containing at least 50 mol % of ethylenic units. The present invention also provides an in-mold foam molding process of an uncrosslinked ethylenic resin prepared by heating and fusion molding the foam particles of the linear ethylenic resin, having a density (D) [Kg/m$^3$] after molding and a stress (F) [Kg/cm$^2$] required for 25% compression of the molded product, which satisfy the relationship represented by the following formula:

$$1.3 \log (D) - 1.87 \leq \log (F) \leq 1.3 \log (D) - 1.61 \qquad (I)$$

(wherein D is 15 to 100 Kg/m³).

The present invention also provides a process for preparing foam particles of a uncrosslinked ethylenic resin, which comprises using the linear ethylenic resin as specified above as the base resin, contacting said resin with a volatile blowing agent at a temperature between the melting point of said resin and the melting point of said resin plus 20° C. to impregnate the resin with the volatile blowing agent and then expanding the impregnated resin.

Furthermore, the present invention provides a process for preparing an in-mold foam molding of a uncrosslinked linear ethylenic resin, which comprises filling the mold with the particles as prepared above, expanding the resin particles in the mold, forming a foam molding by heating the particles while they are maintained in their expanded state, then cooling the molding to a temperature at which its surface solidification is completed and thereafter aging the molding at a temperature of 70° C. or higher, thereby adjusting the density (D) [Kg/m³] of said foam molding and the stress (F) [Kg/cm²] required for achieving the 25% compression requirement of the molding so as to satisfy the relationship represented by formula (I) above.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
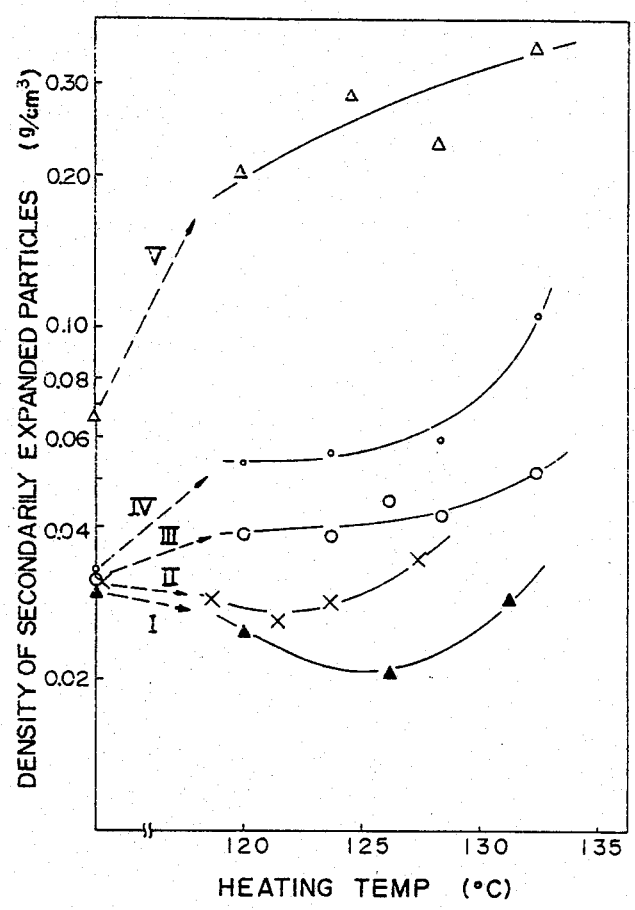
FIG. 1 is a graph showing the relation between the heating temperature of the foam particles and the density of the secondary foam particles.

The base material to be used in the foam particles of the present invention is required to be a linear ethylenic resin satisfying the conditions of having a molecular weight distribution of 15 or higher in terms of the ratio $\overline{Mw}/\overline{Mn}$ of the weight average molecular weight ($\overline{Mw}$) to the number average molecular weight ($\overline{Mn}$) as measured by gel permeation chromatography, having a bimodal wave form in the curve of molecular weight distribution, and also having a weight average molecular weight of $2 \times 10^5$ or higher and a density of 0.920 g/cm³ or higher.

The above weight average molecular weight ($\overline{Mw}$) to the number average molecular weight ($\overline{Mn}$) are values which are measured by gel permeation chromatography and are determined by the calibration curve method with the use of a standard polystyrene sample according to the method shown by ASTM-D-3016-72. It is essentially required in the present invention that the linear polyethylene should have a $\overline{Mw}/\overline{Mn}$ ratio of 15 or higher and a $\overline{Mw}$ of $2 \times 10^5$ or more. Generally, $\overline{Mw}$ may suitably range from about $2 \times 10^5$ to $2 \times 10^6$ and the $\overline{Mw}/\overline{Mn}$ ratio may vary from about 15 to 80.

Furthermore, when there is the additional condition of a bimodal wave form of the molecular weight distribution curve as measured by gel permeation chromatography, the foam molding obtained from such foam particles is even more desirable. According to the present invention, in such a curve of the bimodal wave form, the second peak may exist on either the right or the left side of the principal peak and its effect is confirmed to be exhibited, regardless of whether it may exist at any position on the slope of the principal peak. Secondary expandability of the foam particles is better when heights of two peaks are about same.

The density is a value measured according to ASTM-D-1505, which is required to be 0.920 g/cm³ or more. In this connection, a linear polyethylene having a density of 0.968 is known among those having a $\overline{Mw}$ of $2 \times 10^5$ or more, and this is of course available as the base resin for the foam particles of the present invention.

The requisite conditions concerning the base resin can be expressed in simpler expressions, namely in terms of the conveniently employed melt index and melt index ratio of the resin.

The melt index (M.I.) is a value measured according to ASTM-D-1238 under the conditions of 190° C. and a load of 2.16 Kg, and the melt index ratio is a value of the ratio of high load melt index (H.M.I.) measured according to ASTM-D-1238 under the conditions of 190° C. and a load of 21.6 Kg relative to the melt index, namely a value represented by the following formula:

$$\text{Melt index ratio} = \frac{H.M.I.}{M.I.}$$

It should be noted that the melt index, which is not a simple function of only the molecular weight as described above but also influenced by the molecular weight distribution and the molecular structure, cannot be correlated clearly with the requirements as defined above. Generally speaking, however, the base resin is selected from those having melt indices of 0.7 g/10 min. or less and melt index ratios of 40 or more. For the purpose of determining broad ranges of heating temperature and heating time during the in-mold molding of foam particles and also for providing a satisfactory appearance as well as a satisfactory mechanical strength of the in-mold moldings, it has been determined by the present invention that the base resin should have a melt index in the range from 0.01 to 0.4 g/10 min. and a melt index ratio of from 60 to 150.

As the linear ethylenic resin as described above, high density polyethylenes and linear low density polyethylenes produced by low and medium pressure methods may preferably be employed. It is also possible to use a linear crystalline copolymers containing 50 mol % or more of ethylene with comonomers such as α-alkenes having 3 to 12 carbon atoms, such as for example, propylene, butene, pentene, hexene and the like, provided that the inherent properties, namely thermal and mechanical properties of the polyethylene are not impaired thereby. Mixtures of these polymers and copolymers are also useful as long as the desired properties are maintained.

The "crystalline" copolymers as herein mentioned refer to those having 40% or more of crystallinity calculated from the melting heat content as measured by the differential temperature. Therefore, conventional low density polyethylenes having a large number of branched short chains produced by high pressure method are excluded from the present invention.

Referring next to the process for the preparation of the foam particles of the present invention, first the linear ethylenic resin satisfying the three conditions as defined above is contacted with a volatile blowing agent at a contact temperature range between the melting point of said resin and the melting point of said resin plus 20° C., preferably from the melting point of said resin plus 5° C. to the melting point of said resin plus 15° C. to impregnate said resin with the aforesaid volatile blowing agent, followed by expansion, to produce uncrosslinked foam particles. The melting point of the resin is a value measured by means of a differential scanning calorimeter (Perkin-Elmer Co., DSC 1-B Model) under the conditions of a temperature elevation rate of 10° C./min. and a sample amount of 0.01 g.

The term "uncrosslinked" means a substantially uncrosslinked state, thereby permitting a slight degree of crosslinking, including improvement of melt-flow characteristics of the resin, as represented by a gel content of 10% or less.

The quality of the foam particles of the present invention obtained by expansion in the uncrosslinked state will be influenced by the content of the blowing agent, the depth of impregnation thereof and its distribution. Therefore, for the purpose of obtaining stably excellent foam particles with little variance, it is necessary to impregnate the resin with the volatile blowing agent by bringing the base resin into contact with the volatile blowing agent at a temperature within the contact temperature as specified above.

Figure 2:
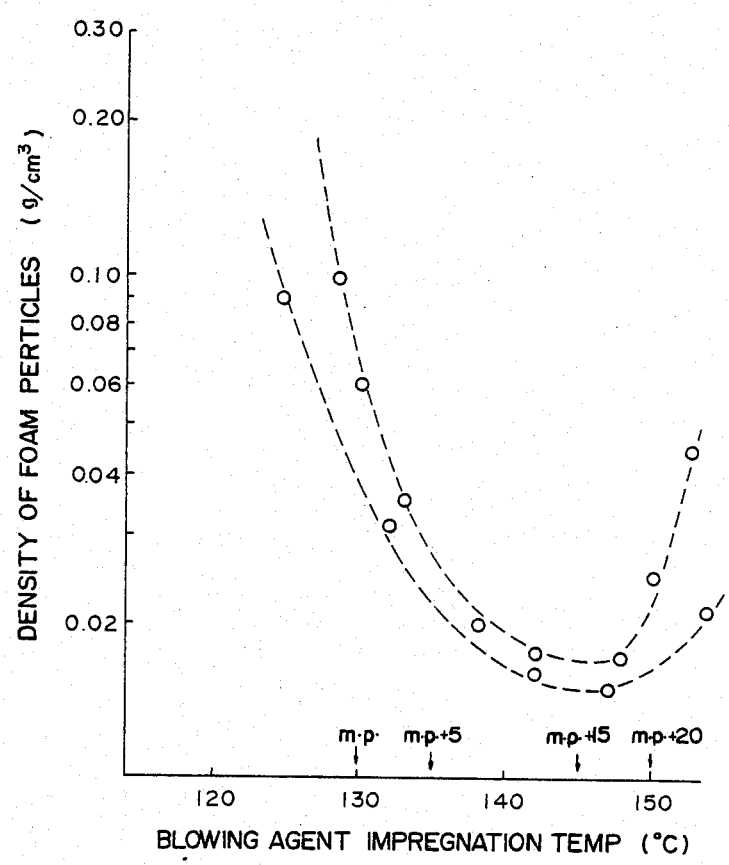
FIG. 2 is a graph showing the relation between the temperature at which the blowing agent is impregnated in the resin in preparing foam particles and the density of the foam particles.

FIG. 2 shows a graph showing the relationship between the impregnation temperature of the blowing agent and the density of the foam particles, and also shows the variance in the foam particles.

As can be seen from this graph, for the purpose of obtaining stable, uniform foam particles of low density (high expansion ratio), it is necessary to impregnate the base resin with a volatile blowing agent within the temperature range from the melting point of the resin to the melting point plus 20° C., and further, for the purpose of suppressing variances in the foam particles, it is desirable to impregnate the base resin with a volatile blowing agent within the temperature range from the melting point of the resin plus 5° C. to the melting point plus 15° C.

In carrying out the impregnation of the base resin with a volatile blowing agent, it is generally conducted under a pressure higher than the vapor pressure of the blowing agent at the above mentioned temperatures.

For example, in the case of incorporating a volatile blowing agent by pressurized injection into a base resin in the molten state after being fed into an extruder and cooling the molten resin mass containing the blowing agent to the temperature as specified above thereby impregnating the resin with the blowing agent, the pressure may be suitably chosen depending on the molecular weight of the base resin for the desired foam particles, the content and the type of blowing agent, the expansion ratio, the extruder and the amount extruded. However, the pressure is generally within the range of from 10 to 400 Kg/cm$^2$.

Alternatively, according to the method in which resin particles are imersed in the liquid of the volatile blowing agent in a pressure vessel to impregnate the blowing agent into the resin particles under the above mentioned temperature and pressure conditions, or the method in which the volatile blowing agent is impregnated into the resin particles suspended in an aqueous suspension in a pressure vessel by contacting the resin at the above mentioned contact temperature and pressure, the pressure may be maintained at a level equal to or higher than the vapor pressure of the blowing agent at said temperature, generally at a pressure of 10 to 100 Kg/cm$^2$ for 0.5 to 10 hours to effect impregnation.

As the volatile blowing agent, it is desirable to use volatile organic blowing agents having KB values within the range from 15 to 60 as determined according to ASTM-D-1133-61. The blowing agent can be selected from known volatile blowing agents, and used either singly or as a mixture, in order to shorten the time necessary for impregnation and also to make the shapes of the foam particles substantially spherical.

The volatile blowing agents which can be utilized in the present invention include aliphatic hydrocarbons such as propane, propylene, butane, butene, pentane, pentene, hexane, hexene, heptane and the like; alicyclic hydrocarbons such as cyclobutane, cyclopentane, cyclohexane and the like; and halogenated hydrocarbons such as trichlorofluoromethane, dichlorodifluoromethane, trichlorotrifluoroethane, dichlorotetrafluoroethane, monochlorodifluoromethane, methyl chloride, methylene chloride, ethyl chloride, ethylene chloride, and the like. The blowing agents may be used either individually or as a mixture of two or more compounds, so that the KB value may fall within the range as mentioned above.

The content of the volatile blowing agent impregnated into the resin may be suitably chose depending on the expansion ratio of the desired foam particles, but generally falls within the range of from 10 to 80% by weight based on the weight of the resin.

The resin particles impregnated with the volatile blowing agent are heated to a temperature in the vicinity of the melting point of the resin and expanded through the vaporizing, expanding force of said blowing agent into foam particles. During this operation, in order to form the necessary amount of uniform cells, it is also possible to use a nucleating agent (including chemical blowing agents) in correspondence to the volatile blowing agent employed.

In general, the cell sizes fall within the range of from 0.05 to 1.0 mm. If the cell size is too great, the flexibility of the foam molding will be impaired, whereas sink marks are liable to be generated after molding in a mold if the cell sizes are too small. Therefore the cell sizes advantageously fall within the range of from 0.1 to 0.5 mm.

When expansion is effected by heating the resin particles containing the blowing agent with a heating medium such as steam, hot water or hot air, there may be employed any of the known methods, including a one step expansion to obtain a product having a target expansion ratio, a two-step expansion including two or more steps by repeating the procedures of expansion, and blowing agent impregnation and delayed expansion after preferentially evaporating the blowing agent on the surface portions of the particles impregnated with the blowing agent. In the present invention wherein expansion is effected in an uncrosslinked state, to enhance the expanding efficiency of the blowing agent or the easiness in obtaining highly expanded particles, it is advantageous to employ the method wherein a blowing agent is incorporated by pressurization into a base resin fed into an extruder in a molten state at a temperature exceeding by more than 20° C. the melting point of the resin, cooling the resin containing the blowing agent to a temperature in the range of from the melting point of the base resin to the melting point of the resin plus 20° C. to impregnate the resin with the blowing agent, and then extruding and expanding the impregnated resin through a nozzle mounted at the tip end of an extruder into a lower pressure zone, and cutting the resin with a rotary blade, etc. into foam particles. Alternatively, the resin particles, impregnated with a blowing agent placed in a liquid phase (mainly aqueous phase) are adjusted to a temperature and pressure suitable for expansion, and then exposed to an atmosphere of lower temperature and lower pressure together with the liquid (mainly water) and then expanded all at once to produce foam particles having a target expansion ratio.

In preparation of foam particles according to the extrusion-expansion method, the expanded strand may be compulsorily cooled simultaneously with the expansion by utilizing cooling air or a water spray, whereby skin layers with film thicknesses thicker than the cell films inside of the particles can be formed on the surfaces of the foam particles. Thus, as also confirmed by the present invention, by making the skin layers on the particle surfaces thicker by 4-fold or more than the inner cell films, there can be obtained foam particles with excellent in-mold expanding ability.

By employing the methods as described above, it is possible to obtain foam particles of a linear ethylenic resin having a closed-cell percentage of 60% or higher. The closed-cell percentage as herein mentioned is measured by an air comparison type specific gravimeter and refers to the percentage of the closed cells in the foam particles based on the total cells. The foam particles with a closed-cell percentage of less than 60% are inferior in expandability of the foam particles and poor in in-mold moldability, as described in detail in Japanese Laid-open Patent Publication No. 85158/1974 which is a technique of in-mold moldings of crosslinked polyethylene of the prior art. Of course, the closed-cell percentage is preferably as great as possible.

Next, expandability for enabling in-mold expansion is imparted to the thus prepared foam particles. As the method for imparting expandability, there may be employed any of the known methods, for example, (1) the gas pressure compression method, wherein the foam particles are placed under a pressurized atmosphere of an inert gas such as nitrogen to compress said foam particles to a bulk volume of 60 to 95% of the original bulk volume, thus making the elastic recovery force created by such a compression the main force of in-mold expandability, or (2) the gas pressure addition method, in which the foam particles are held under a pressurization of 0.5 to 20 $Kg/cm^2$ by the aforesaid gas (blowing agent gas) or a gas mixture of an inert gas and a volatile blowing agent impregnated therewith for 0.5 to 10 hours, thereby enhancing the gas pressure within the particles to about 0.5 to 3 $Kg/cm^2$ and utilizing the expanding force of said gas as the main force of the in-mold expandability, or (3) the combined method using these methods in combination. However, in the method wherein the foam particles are compressed, it is generally required to highly compress the foam particles in order to obtain a large elastic recovery force and the elastic recovery force must be exhibited within a mold having dimensions of a predetermined size. Hence, the resultant foam molding tends to have a greater density. On the other hand, in the method wherein the gas pressure within the particles is increased, there is recognized the tendency that fusion between the particles on the surface side of the molding proceeds at a faster rate, whereby fusion in the inner portion is lowered. Accordingly, it is desirable according to the present invention to use, in combination, the method in which the foam particles are compressed to a bulk volume of about 80 to 95% of the original bulk volume and the method in which the inner pressure within the particles is increased to about 0.5 to 2.0 $Kg/cm^2$. Of course, when employing both of these methods, the inner pressure of the foam particles is increased according to the gas pressure addition method before employing the gas pressure compression method.

Imparting of such an expandability to the particles is necessary in order to fill the gaps between the particles formed when filling the mold with the foam particles and also to effect close bonding fusion between the adjacent particles. Thus, the degree of quality obtained in the molded product, such as the elimination of surface pocimarks outer dimensional precision, mechanical strength based on the extent of the fusion of inner portions or the cusioning property, will depend on whether this expandability can be achieved to its maximum extent and effectively during heating in the mold.

Referring now to the accompanying drawings, it can be seen why the linear ethylenic resin to be used in the present invention must satisfy the three conditions mentioned above. FIG. 1 is a graph showing an example of the relationship between the heating temperature of the foam particles endowed with an expandability of 1 $Kg/cm^2G$ and the density of the secondarily expanded foam particles. In this figure, curve I shows foam particles employing linear polyethylene with a density of 0.940 and satisfying the necessary requirements of the base resin of the present invention; curve II employs a linear polyethylene with a density of 0.920 and satisfying the necessary requirements of the base resin of the present invention; curve III employs a linear polyethylene satisfying the necessary conditions of the present invention except for $\overline{M}w$, i.e., having a $\overline{M}w$ of less than $2 \times 10^5$; curve IV employs a linear polyethylene satisfying the necessary conditions of the present invention except for the $\overline{M}w/\overline{M}n$ ratio, i.e., having a $\overline{M}w/\overline{M}n$ ratio of less than 15; and curve V employs a linear polyethylene satisfying the necessary conditions of the present invention except for density, i.e., having a density of less than 0.920.

As can be seen from FIG. 1, in the foam particles III, IV and V employing linear polyethylenes not completely satisfying the necessary conditions of the present invention, the density is increased, namely the product has shrunk due to heating. In contrast, in the foam particles I and II which completely satisfy the necessary conditions of the present invention, there exists a temperature region where the particles are constantly reduced in density, namely expanded, and under certain temperature conditions, they have an expandability up to about 1.7-fold in terms of the density ratio relative to the original foam particles. As mentioned above, the largeness of this expandability will influence the final quality of the molding, such as its physical properties, including mechanical strength based on the extent of fusion between the particles, moisture absorption, outer dimensional precision, or the generation of surface pockmarks.

In this sense, FIG. 1 shows the difficulty of in-mold expansion molding of foam particles of polyethylene resins which do not completely satisfy the necessary conditions of the present invention utilizing ethylenic resins in an uncrosslinked state, or in other words uncrosslinked in-mold expansion molding of particles of a linear polyethylene resin can be realized for the first time by the use of foam particles of the present invention.

As the method for filling the mold with the foam particles endowed with expandability, there may be generally employed the method wherein the foam particles are pneumatically delivered; the method in which the mold is brought to a reduced pressure, or the method in which these methods are used in combination.

In-mold heating is generally conducted by the use of steam. Accordingly, it is desirable to use a mold cavity comprising mold walls having a large number of perforations having sizes permitting the passage of gases but at the same time capable of impeding flow of foam particles enclosed within the chamber. The foam particles are directly heated with the steam pressurized into the mold through said perforations.

The in-mold heating is conducted within the time before the expandability imparted to the foam particles disappears. The heating operation, which varies depending upon the molding device employed, the shape of the molding and its thickness is generally practiced immediately after filling the mold with foam particles. As the result, the foam particles, and thus the individual particles fuse closely together to form an integrated, foam molding.

The foam molding thus obtained is cooled through the mold cavity to a temperature necessary for complete solidification of its surface by using water or another cooling medium. Usually, the foam molding is removed at this point from the mold cavity. However, the foam molding in this state will frequently have sink marks or shrinkage deformations, with its density being slightly lower than the target value. For this reason, according to the present invention, the foam molding is subjected to aging at a temperature of 70° C. or higher in order to obtain a desired foam molding. In this case, it is preferred to effect aging by permitting the product to reside in a room adjusted to a temperature within the range from 70° to 110° C., particularly for 8 hours or longer in the case of an in-mold molding which possesses a large degree of non-uniformity in thickness.

Figure 3:
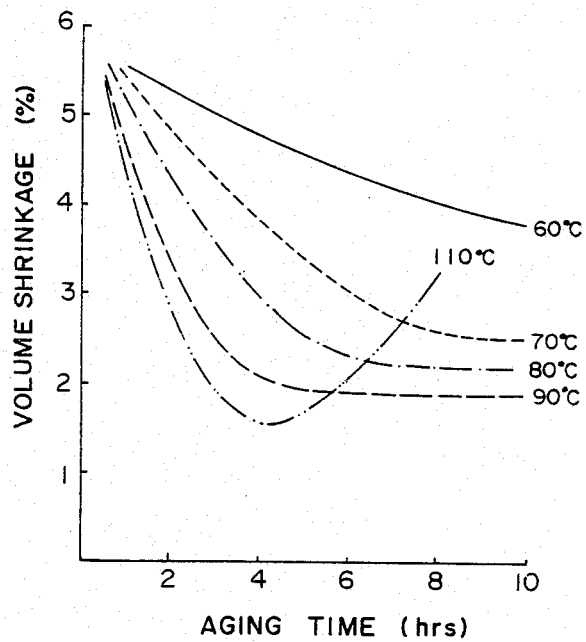
FIG. 3 is a graph showing the relation between the aging time and the percent shrinkage of the volume of the foam molding when the aging temperature of the foam molding is varied.

FIG. 3 is a graph showing an example of the relationship between the aging time and the percent volume shrinkage at respective aging temperatures during aging of a foam molding. As can be seen from FIG. 3, in order to obtain a foam molding with a high mold reproducibility, an aging temperature of 70° C. or higher is necessary and the aging time is preferably as short as possible from the standpoint of productivity. An aging temperature of 80° C. or more is preferred for shortening the aging time. On the other hand, if the aging temperature is too high, the foam molding may sometimes reshrink when removed from the mold and left to cool and therefore too high an aging temperature is not desirable.

Figure 4:
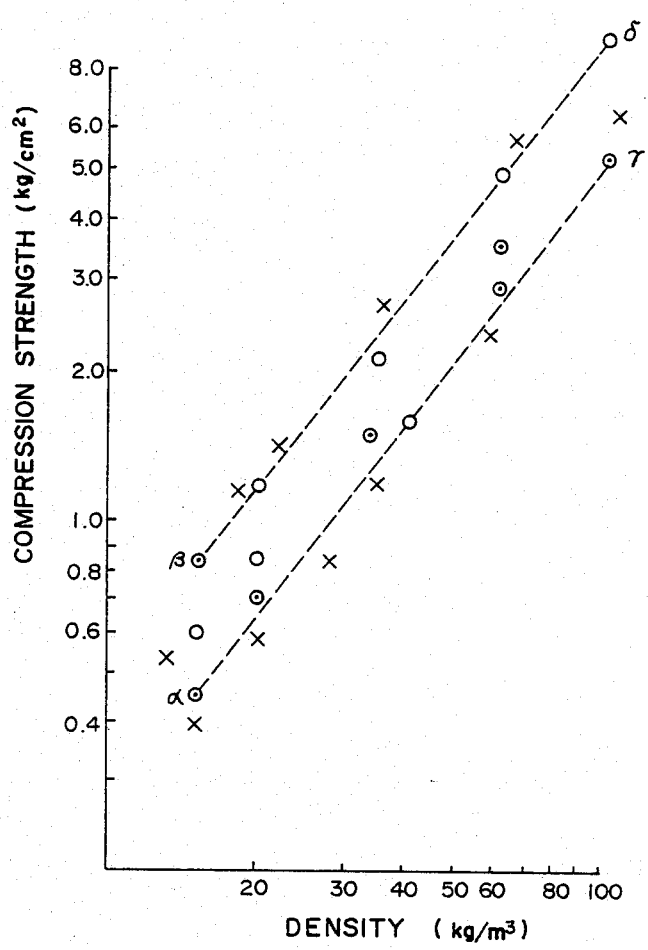
FIG. 4 is a graph showing the relation between the density and the compression strength of the foam molding.

FIG. 4 is a graph showing the relationship between the density (D) [Kg/m$^3$] and the compression strength (stress necessary for 25% compression of the molding) (F) [Kg/cm$^2$] in the in-mold foam molding of the present invention. This figure is also an analytical chart obtained by preparing various foam particles with various expansion ratios by the use of a base resin which completely satisfy the necessary conditions of the present invention; forming foam moldings by molding the foam particles under the molding conditions selected from among the methods of the present invention, followed by aging treatment; and evaluating the foam moldings thus prepared.

This evaluation shows that the internal structure within the foam molding, namely the cellular structure of the foam particles and the closely fused state between the particles, will influence the mechanical properties of the foam molding. For example, if expandability is insufficiently imparted to the foam particles filled in the mold, voids tend to occur between the foam particles, whereby the mechanical strength of the resultant in-mold molding will be lowered. On the contrary, if expandability is excessively imparted, inter-particle fusion proceeds faster at the surface portion of the molding upon heating in the mold, particularly in the gas pressure compression method, whereby the mechanical strength is increased but the inter-particle fusion in the inner portion will not be sufficient.

Based on such speculations, as the alternative method for evaluating the degree of inner particle fusion, moisture absorption was taken as a measurement and evaluated (with the moisture absorption of 0.2 vol % being made the standard, and values greater than this being marked with an X and values less than this being marked with an 0), and the correlation with the compression strength of the foam molding was determined. During this analysis, since the compression strength of the foam molding is greatly influenced by its density, these parameters were dealt with separately.

As is clear from FIG. 4, the group indicated by the mark O is distributed such that it is surrounded by the group indicated by the mark X. The group indicated by the mark O, as seen from the inner pressure within the foam particles placed in the mold or the compression ratio and the aging conditions after molding, are all foam moldings which are obtained from the foam particles to which expandability is imparted so that the compression ratio may be 20% or less or the inner pressure within the particles may be 0.5 Kg/cm$^2$ or higher, and subjected to aging after molding under the aging conditions of the present invention (70° C. or higher, 8 hours). In contrast, those marked with the X indicate foam moldings obtained without satisfying the above conditions.

In FIG. 4, the upper limit portions of the mark O can be linked with a straight line represented by log (F)=1.3 log (D)−1.61, and also the lower limit portions of the mark O can be linked similarly with a straight line represented by log (F)=1.3 log (D)=1.87. Also, since the density (D) of the foam molding is a value within the range of 15 to 100 Kg/cm³, the lines corresponding to these limiting values can be drawn on the graph, taking out a group consisting only of the mark O enclosed within the four lines as distinguished from the other groups. The scope enclosed within the four lines may be also expressed, in terms of the coordinate points [(D), (F)] as represented by the relationship between the density of the foam molding (D) and the stress required for 25% compression of said foam molding (F), as the part enclosed by the lines linking successively the respective points of α [15, 0.46], β[15, 0.83], γ[100, 5.37] and δ[100, 9.77].

Thus, the foam molding which can satisfy the condition of formula (I):

$$1.3 \log (D) - 1.87 \leq \log (F) \leq 1.3 \log (D) - 1.61 \quad (I)$$

wherein D is 15 to 100 Kg/m³, can be stated to be a foam molding with close fusion between the inner particles, in spite of the fact that it is an in-mold foam molding obtained from foam particles of an uncrosslinked linear polyethylene.

In order to effect more excellent fusion within the foam molding, it is desirable to use a linear ethylenic resin as the base resin, having a density of 0.940 or higher and exhibiting a bimodal shape of the molecular weight distribution curve as determined by GPC. This can be understood also from the facts that a resin having a density of 0.940 is higher in reexpandability when compared with one having a density of 0.920, as shown in FIG. 1, and that resin exhibiting a bimodal shape of the molecular weight distribution curve can give a foam molding which is more excellent in moisture absorption within the foam as compared with one exhibiting a unimodal shape, as shown in Table 3.

Figure 5:
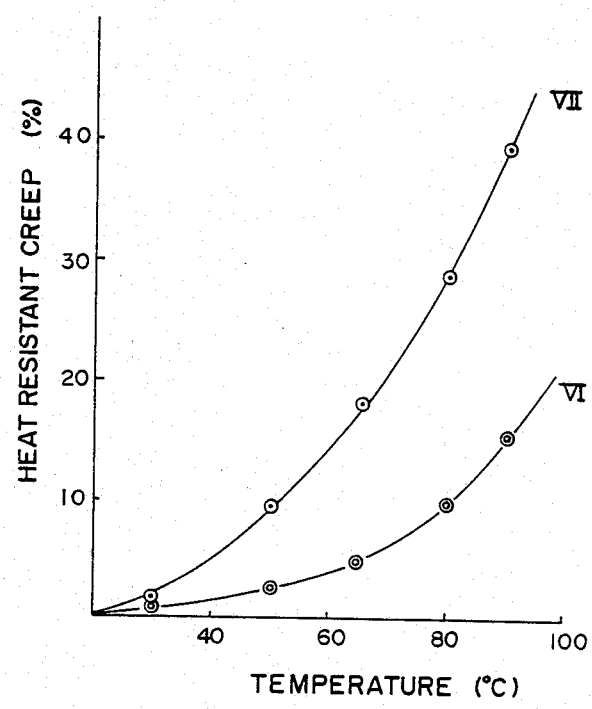
FIG. 5 is a graph showing the relation between the heating temperature of the foam molding and the heat resistant creep.
Figure 6:
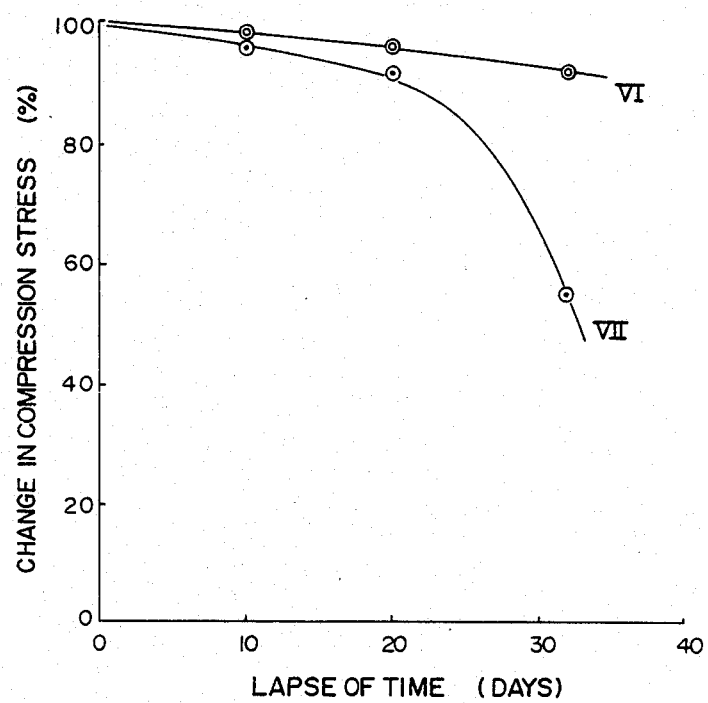
FIG. 6 is a graph showing the relation between the lapse of time in the heated state of the foam molding and the percent change in the compression stress.
Figure 7:
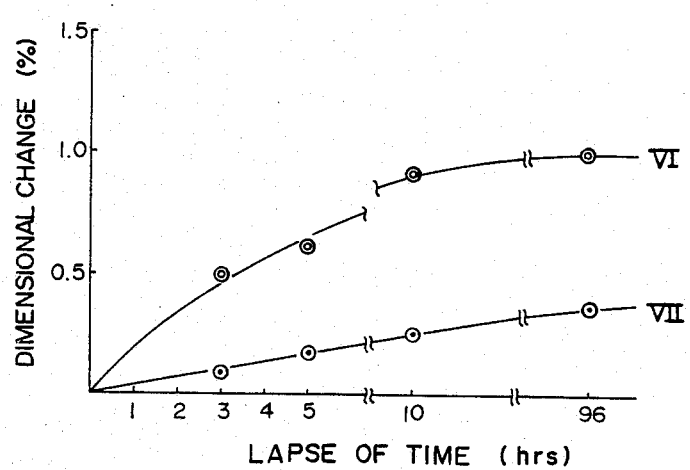
FIG. 7 is a graph showing the relation between the lapse of time in the heated state of the foam molding and the percent of dimensional change.
Figure 9:
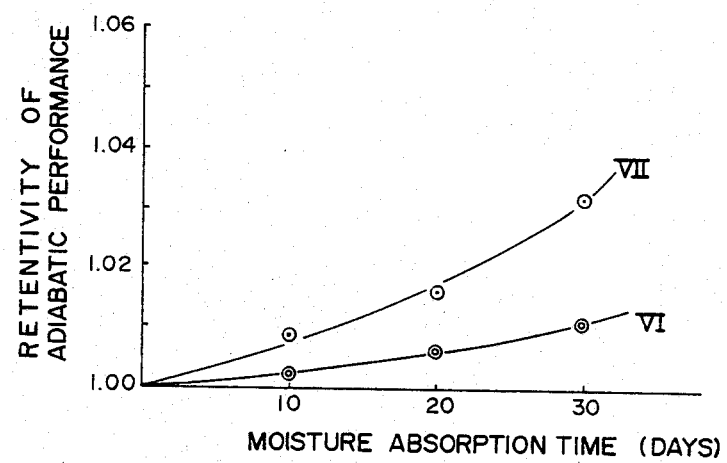
FIG. 9 is a graph showing the relation between the moisture absorbing time and the retentivity with a lapse of time of adiabatic performance of foam molding.
Figure 10:
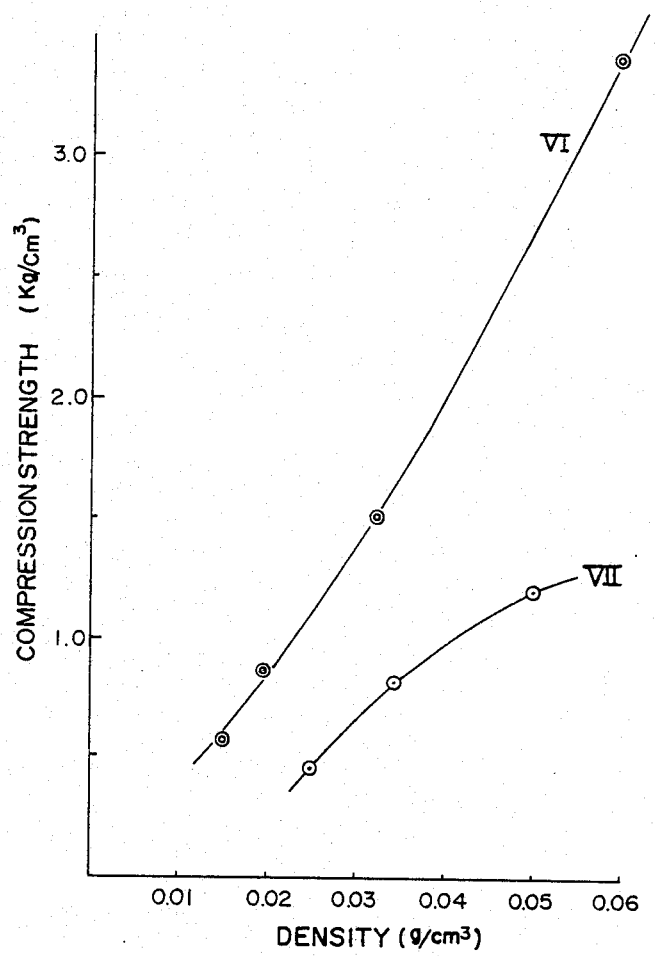
FIG. 10 is a graph showing the relation between the density and the compression strength of the foam molding.

FIGS. 5, 6, 7, 9 and 10 are graphs showing the characteristics of the in-mold foam molding of the present invention as compared with the in-mold foam molding of a crosslinked polyethylene resin at the highest level of the prior art. FIG. 5 is a graph showing the relation between temperature and heat resistant creep; FIG. 6 shows the relationship between a lapse of time under a heated state and the percentage change of compression stress; FIG. 7 shows the relationship between a lapse of time under a heated state and the percent of dimensional change; FIG. 9 shows the relationship between the moisture absorption time and the retentivity with a lapse of time of adiabatic performance; and FIG. 10 shows the relationship between density and compression strength. In these figures, VI indicates the in-mold foam molding of the present invention and VII indicates the in-mold foam molding of a crosslinked polyethylene at the highest level of the prior art (prepared according to Japanese Laid-open Patent Publication No. 70621/1982).

As can be seen from these figures, the in-mold foam molding of the present invention is superior in all of the respective heat resistant characteristics and adiabatic performance, as compared with the in-mold foam molding of a crosslinked polyethylene resin at the highest level of the prior art, and moreover has higher compression strength (rigidity) at the same density.

The in-mold foam molding of the uncrosslinked ethylenic resin of the present invention is obtained without requiring a crosslinking and thus is economically very advantageous, since the molding, when becoming useless, can be returned to the original resin for reuse. Moreover, when compared with the in-mold foam molding of crosslinked polyethylene resin of the prior art, it is more excellent in heat resistant characteristics such as heat resistant creep, heat resistant deterioration and heat resistant shrinking as well as adiabatic performance, and therefore is useful as a heat insulating material in automobiles, ships, roofs of houses, heat insulation of outer walls or hot water pipes, even when directly subjected to high temperatures. Furthermore, the in-mold foam molding of the present invention, having a higher rigidity when compared with the crosslinked polyethylene of the prior art, is applicable to a much wider scope of uses.

The present invention is described in further detail by referring to the following Examples, which should not be considered in any way as limiting the scope of the present invention.

Table 1 shows the characteristics of the polyethylene resins employed in the respective Examples.

TABLE 1

| Resin | Density (g/cm³) | M.P. of crystal (°C.) | $\overline{M}_w \times 10^5$ | $\overline{M}_w/\overline{M}_n$ | Peak No. | M.I. | M.I.R. |
|---|---|---|---|---|---|---|---|
| A. | 0.965 | 137 | 2.0 | 15 | 2 | 0.36 | 77 |
| B. | 0.952 | 130 | 4.0 | 23 | 2 | 0.02 | 125 |
| C. | 0.940 | 126 | 3.2 | 20 | 2 | 0.21 | 43 |
| D. | 0.920 | 118 | 2.5 | 19 | 2 | 0.7 | 85 |
| E. | 0.960 | 134 | 1.7 | 17 | 2 | 0.31 | 84 |
| F. | 0.953 | 130 | 2.1 | 11 | 1 | 0.9 | 36 |
| G. | 0.915 | 114 | 2.8 | 15 | 1 | 0.2 | 32 |

Note
$\overline{M}_w$ and $\overline{M}_n$ were measured values according to the method as described above by means of Model 200 GPC, produced by Waters Co.

Measurement and evaluations of the characteristics in the respective Examples were conducted as described below.

(1) Inner pressure of foam particles:

About 10 g of foam particles taken from a pressurized atmosphere is quickly apportioned into five vessels and their weights (W) are accurately measured. Then, they are connected to five water column tubes, each being opened at one end to atmospheric pressure, and the gas volume (Vo) which escapes from the foam particles is measured with a lapse of time to determine the respective values according to the following equation, and the average value is defined as the inner pressure:

$$\text{Inner pressure of foam particles} = \frac{V_o}{V_s - W/D}$$

[unit: Kg/cm²]

where D is the density of the polyethylene employed and Vs is the volume of foam particles calculated from the measured weight of the foam particles by using a coefficient of calculation determined from the weight and the volume of a sample obtained in a large amount from the same population.

The end point of measurement in this case is the point where the difference in inner pressure within one hour becomes less than 0.01 Kg/cm².

(2) Water absorption:

From the central portion of the molding, a test strip of 200 mm×200 mm with a thickness of 50 mm is prepared, its volume (V) and weight (W) being accurately measured and then immersed in fresh water at about 20° C. at a depth of 25 mm from the water surface for 24 hours. After withdrawal of the test strip, the surface is quickly wiped off and the weight gain (ΔW) after immersion is determined and calculated according to the following equation:

$$\text{Water absorption (vol \%)} = \frac{\Delta W \times 100}{V \times \text{Density of water}}$$

(3) Compression strength:

A sample cut having the dimensions 100 mm×100 mm and a thickness of 25 mm is compressed at a rate of 12±3 mm/min. and the stress value of the compression is measured when 25% strain is formed.

Figure 8:
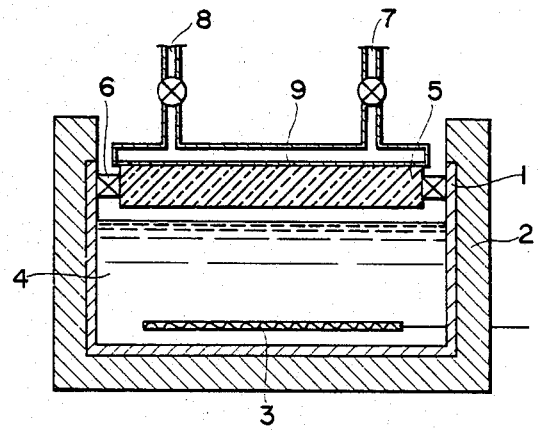
FIG. 8 is a sectional view of a device for measuring the retentivity with a lapse of time of adiabatic performance.

(4) Retentivity with lapse of time of adiabatic performance:

For a test strip of molding cut from the central portion having the dimensions 200 mm×200 mm and a thickness of 25 mm, a measurement is made using the device as shown in FIG. 8. That is, warm water 4 of 50° C. is charged into a vessel 1 equipped with a temperature controller 3, and the open side of the vessel is plugged with the above test strip through an intermediary packing 6. The test strip is thereby arranged so that a distance of about 30 mm is provided between the lower face of the test strip and the warm water face in the vessel. On the other hand, the upper face of the test strip is closely contacted with a cooling plate 9 which is cooled at 3° C. with cooling water being circulated through the water circulating inlet and outlets 7 and 8. After being left to stand, while maintaining such a state for 30 days, the surface of the test strip is lightly wiped off and its thermal conductivity λ' is measured and the ratio λ'/λ of change relative to the thermal conductivity λ measured before the test under the same conditions is determined.

(5) Dimensional change under heating:

A test strip of molding cut in a 50 mm cube is placed in a thermostat controlled to a temperature of 90° C. for 96 hours, and removed and left to cool for 1 hour. The dimensional change (%) based on the original molding is then determined.

(6) Heat resistant creep:

To a test strip of molding having the dimensions 50 mm×50 mm×25 mm is applied a load of 0.1 Kg/cm² under a temperature of 80° C. The thickness is immediately measured and also after a lapse of 24 hours (t) from which the creep is calculated according to the following equation:

$$\text{Compression creep (\%)} = \frac{t_0 - t}{t_0} \times 100$$

(7) Evaluation of heat resistant deterioration:

From the central portion of the molding is cut a test strip having the dimensions 50 mm×50 mm×30 mm, which is placed in a hot air dryer set at 100° C. The test strip is taken out periodically for measurement of the stress on 25% compression. The stress required before heat treatment is made as 100% and the stress required for samples subjected to heating treatment is expressed in terms of percentage.

EXAMPLE 1, COMPARATIVE EXAMPLE 1

In a pressure vessel, 100 parts by weight of uncrosslinked particles of ethylene resin A, 25 parts by weight of n-butane and 2 parts by weight of magnesium carbonate are dispersed in 400 parts by weight of water, and the dispersion is heated with stirring to a temperature higher by 5° C. than the crystal melting point of the resin and maintained at this temperature for 45 minutes to cause the blowing agent to be impregnated into the particles. Then, the vessel is pressurized with nitrogen gas to a pressure higher by 5 to 6 Kg/cm² than the vapor pressure of the blowing agent at said temperature, and while maintaining the inner pressure at higher than the vapor pressure of the blowing agent, the resin particles and water are released into an atmosphere of normal pressure from one end of the vessel to obtain foam particles. For other polyethylene resins C, D, E, F and G, the same procedure is repeated to obtain respective foam particles. For the respective resins, the temperatures during expansion and the densities of the foam particles thus obtained are shown in Table 2.

As the next step, each of the above foam particles is left to stand under atmospheric pressure for one week, placed in a pressure vessel, pressurized with nitrogen gas to a pressure of 10 Kg/cm²·G and maintained at 80° C. to adjust the inner pressure with said foam particles to 0.6–0.8 Kg/cm²·G, followed by cooling and removed to normal pressure. Subsequently, the particles having this inner pressure are immediately charged into a steam chamber and heated at various temperatures to effect secondary expansion. The particles thus obtained are left to stand under atmospheric pressure to carry out aging, and thereafter the density of the particles is measured.

The minimum density of the secondarily expanded particles and the heating temperature used are shown in Table 2, and the relationship between the heating temperature and the density of the secondarily expanded particles is shown for the particles of resins C, D, E, F and G in the graph of FIG. 1, and the respective graphs are marked with I, II, III, IV and V.

As apparently seen from Table 2 and FIG. 1, secondarily expanded particles having a density lower than that of foam particles can be obtained only when the polyethylene resin used as the base resin has a weight average molecular weight ($\overline{M}w$) of $2 \times 10^5$ or more, a molecular weight distribution, namely a $\overline{M}w/\overline{M}n$ ratio of 15 or more and a density of 0.920 or more. It can also be seen that a resin having a density of 0.940 should be chosen if it is desired to obtain a greater secondary expanding force.

EXAMPLE 2, COMPARATIVE EXAMPLE 2

By means of a 40 φ extrusion expansion device comprising an extruder having a hole for pressurization of a blowing agent at the middle portion of the barrel, a kneading portion and a cooling portion, provided at its tip end with a perforated die having a number of nozzles of 1 mm φ and also equipped with a rotary blade which rotates in contact with the die face, the resins A, B, C and F are each fed from the hopper at a rate of 2 Kg/hr, and a mixed blowing agent of dichlorotetrafluoroethane and the methylene chloride is pressurized into the extruder at a rate of 0.9 Kg/hr. After fusion mixing, the mixture is cooled to the melting point +5° C. of each resin, extruded through the perforated die while being expanded and cut by a rotary blade into foam particles.

aged in a hot air dryer at 70° C. for 8 hours to obtain a foam molding.

For each of the moldings thus obtained, the density

TABLE 2

| EXAMPLES | RESIN CHARACTERISTICS | | | FOAM PARTICLES | | SECONDARY EXPANSION | |
|---|---|---|---|---|---|---|---|
| | RESIN | DENSITY (g/cm$^3$) | $\overline{Mw} \times 10^5$ | $\overline{Mw}/\overline{Mn}$ | IMPREGNATION TEMP. (°C.) | DENSITY (g/cm$^3$) | HEATING TEMP. (°C.) | MINIMUM DENSITY (g/cm$^3$) |
| EXAMPLE 1 | A | 0.965 | 2.0 | 15 | 142 | 0.036 | 131 | 0.025 |
| | C | 0.940 | 3.2 | 20 | 131 | 0.029 | 128 | 0.019 |
| | D | 0.920 | 2.5 | 19 | 123 | 0.033 | 124 | 0.030 |
| COMPARATIVE | E | 0.960 | 1.7 | 17 | 139 | 0.031 | 120 | 0.039 |
| EXAMPLES | F | 0.953 | 2.1 | 11 | 135 | 0.032 | 120 | 0.053 |
| | G | 0.915 | 2.8 | 15 | 119 | 0.067 | 120 | 0.250 |

The foam particles thus obtained are endowed with an inner pressure in the same manner as in Example 1 and the secondary expanding force is evaluated. The results are shown in Table 3a.

Next, the foam particles obtained in experiment No. 2 are treated in an air atmosphere of 80° C. which is pressurized at 10 Kg/cm$^2$·G by controlling the treatment time so that the inner pressure within the particles have values as indicated in Table 3b to give foam particles containing air. Alternatively the foam particles are compressed at normal temperatures and under air pressures as indicated in Table 3b to be compressed to volumes lower than the original bulk volume, and introduced as such into a closed cavity (inner dimensions 300×300×80 mm) having small perforations, followed by fusion by heating with steam at a pressure of 1.5 to 2.0 Kg/cm$^2$ for 20 to 30 seconds. Subsequently, the produce is cooled with water at a temperature of 20° C. for 30 to 60 seconds, and then taken from the mold and after aging, the water absorption and the dimensional shrinkage of the molding relative to the mold cavity dimension are measured to obtain the results shown in Table 3b.

As can be seen from Table 3b, in order to obtain a foam molding having a water absorption within 0.2 vol % and a shrinkage relative to the mold cavity dimension within 5%, according to the gas compression method as the method for imparting in-mold expandability, it is required to take a compression percentage of the foam particles within the range of from 5 to 40%.

TABLE 3a

| EXAMPLES | EXPERIMENT NO. | RESIN CHARACTERISTICS | | | | |
|---|---|---|---|---|---|---|
| | | | DENSITY (g/cm$^3$) | $\overline{Mw} \times 10^5$ | $\overline{Mw}/\overline{Mn}$ | M.I. | M.I.R. |
| EXAMPLE 2 | 1 | A | 0.965 | 2.0 | 15 | 0.36 | 77 |
| | 2 | B | 0.952 | 4.0 | 23 | 0.02 | 123 |
| | 3 | C | 0.940 | 3.2 | 20 | 0.21 | 43 |
| COMPARATIVE | 4 | F | 0.953 | 2.1 | 11 | 0.9 | 36 |
| EXAMPLE NO. 2 | 5 | F | 0.953 | 2.1 | 11 | 0.9 | 36 |

| EXAMPLES | EXPERIMENT NO. | | FOAM PARTICLES | | | | SECONDARY EXPANSION | |
|---|---|---|---|---|---|---|---|---|
| | | | IMPREGNATION TEMP. (°C.) | DENSITY (g/cm$^3$) | CLOSED CELL PERCENTAGE (%) | AVERAGE CELL SIZE (Mm) | HEATING TEMP. (°C.) | MINIMUM DENSITY (g/cm$^3$) |
| EXAMPLE 2 | 1 | A | 139 | 0.030 | 97 | 0.6 | 135 | 0.024 |
| | 2 | B | 135 | 0.029 | 97 | 0.3 | 130 | 0.018 |
| | 3 | C | 130 | 0.027 | 94 | 0.1 | 126 | 0.020 |
| COMPARATIVE | 4 | F | 130 | 0.038 | 57 | 0.05 | 128 | 0.088 |
| EXAMPLE NO. 2 | 5 | F | 135 | 0.028 | 89 | 0.8 | 128 | 0.045 |

TABLE 3b

| FOAM PARTICLES | | CAVITY FILLING CONDITIONS | | CHARACTERISTICS OF MOLDINGS | | |
|---|---|---|---|---|---|---|
| NO. | DENSITY (Kg/m$^3$) | INNER PRESSURE IN PARTICLES (Kg/cm$^2$·G) | COMPRESSION % | DENSITY (Kg/m$^3$) | WATER ABSORPTION (Vo. %) | SHRINKAGE RELATIVE TO CAVITY DIMENSION (%) |
| 2 | 29 | 0 | 50 | 37 | 0.51 | 1.5 |
| | | 0 | 40 | 31 | 0.11 | 2.3 |
| | | 0 | 25 | 29 | 0.14 | 3.2 |
| | | 0 | 5 | 26 | 0.19 | 4.1 |
| | | 0 | 0 | 33 | 0.48 | 9.8 |
| | | 3.5 | 0 | 27 | 0.43 | 0.9 |
| | | 3.0 | 0 | 27 | 0.19 | 1.8 |
| | | 1.5 | 0 | 27 | 0.14 | 2.5 |
| | | 0.5 | 0 | 28 | 0.20 | 4.8 |

On the other hand, in the gas addition method, it can be seen that the inner pressure within the foam particles is required to be taken within the range of from 0.5 to 3.0 Kg/cm$^2$.

EXAMPLE 3, COMPARATIVE EXAMPLE 3

For the resins B and C, Example 1 is repeated, except that expansion is conducted by varying the impregnation temperatures for the blowing agents, to obtain foam particles. For the foam particles thus obtained, the relation between the impregnation temperatures for the blowing agents and the densities of the foam particles are shown in Table 4. Also, for the foam particles using resin B, the relationship between the impregnation temperature for the blowing agent and the density of the foam particles is shown by the graph in FIG. 2.

Next, each of the above foam particles is treated in pressurized air at 80° C., and 10 Kg/cm²·G, and by controlling the treatment time an inner pressure value is obtained within the particles as indicated in Table 4 to form expanded particles containing air. Then, the volume of the particles is compressed to a volume smaller than the original bulk volume to produce compression percentages as indicated in Table 4. The particles are then introduced into a closed mold cavity (inner dimensions 300×300×80 mm) having small perforations, followed by fusion by heating with steam at a pressure of 1.5 to 2.0 Kg/cm² for 20 to 30 seconds. Subsequently, after cooling with water at about 20° C. for 30 to 60 seconds, the molding is taken from the mold and aged in hot air maintained at a predetermined temperature for 8 hours to obtain a foam molding.

The foam moldings obtained are numbered as 1 to 31.

For each of the foam moldings obtained, density, compression strength and water absorption after aging are measured and shown in Table 4.

Furthermore, each foam molding is marked with an X if it has a water absorption greater than 0.2 vol %, as the standard, and marked with an O if it has a water absorption smaller than the standard, and its relationship to the density and compression strength is plotted in FIG. 4.

As apparently seen from FIG. 2, for obtaining foam particles having a stable target expansion ratio without variance, the base resin is required to be impregnated with a blowing agent at a temperature within the range of from the melting point of the base resin to a temperature 20° C. greater than said melting point. Furthermore, for suppressing variances in the foam particles, it is particularly desirable to impregnate the resin with a blowing agent at a temperature within the range of 5° C. above from the melting point of the base resin to 15° C. above the melting point of the resin.

Also, as can be seen from Table 4, moldings 14 and 17–20 and FIG. 3, for obtaining a foam molding with high mold reproducibility, the aging temperature immediately after molding is required to be 70° C. or higher and the aging time preferably 8 hours or longer.

TABLE 4

| NO. | RESIN | FOAM PARTICLES IMPREGNATION TEMP. (°C.) | DENSITY (g/cm³) | CAVITY FILLING CONDITIONS INNER PRESSURE IN PARTICLES (Kg/cm²) | COMPRESSION (%) | AGING TEMP. (°C.) | CHARACTERISTICS OF MOLDINGS DENSITY (Kg/m³) | COMPRESSION STRENGTH (Kg/cm²) | WATER ABSORPTION (%) |
|---|---|---|---|---|---|---|---|---|---|
| 1 | B | 125 | 0.090 | 3.0 | 15 | 70 | 100 | 5.37 | 0.16 |
| 2 | B | 125 | 0.090 | 0 | 30 | 70 | 106 | 6.51 | 0.42 |
| 3 | B | 128 | 0.098 | 2.5 | 0 | 70 | 100 | 9.77 | 0.13 |
| 4 | B | 130 | 0.061 | 1.5 | 25 | 70 | 63 | 5.65 | 0.35 |
| 5 | B | 130 | 0.061 | 1.0 | 20 | 70 | 60 | 5.06 | 0.15 |
| 6 | B | 130 | 0.061 | 1.0 | 10 | 70 | 60 | 3.45 | 0.09 |
| 7 | B | 132 | 0.032 | 1.5 | 25 | 70 | 35 | 2.48 | 0.33 |
| 8 | B | 132 | 0.032 | 1.0 | 10 | 70 | 32 | 1.50 | 0.12 |
| 9 | B | 133 | 0.034 | 1.0 | 10 | 70 | 34 | 2.09 | 0.08 |
| 10 | B | 138 | 0.020 | 1.5 | 25 | 70 | 22 | 1.40 | 0.39 |
| 11 | B | 138 | 0.020 | 1.0 | 10 | 70 | 20 | 1.18 | 0.11 |
| 12 | B | 138 | 0.020 | 0.5 | 10 | 70 | 20 | 0.70 | 0.15 |
| 13 | B | 138 | 0.020 | 1.0 | 10 | 115 | 28 | 0.83 | 0.24 |
| 14 | B | 138 | 0.020 | 1.0 | 10 | 90 | 20 | 0.85 | 0.11 |
| 15 | B | 138 | 0.020 | 1.0 | 10 | 80 | 20 | 0.83 | 0.13 |
| 16 | B | 138 | 0.020 | 1.0 | 10 | 60 | 25 | 0.79 | 0.31 |
| 17 | B | 142 | 0.018 | 1.5 | 25 | 70 | 18 | 1.15 | 0.37 |
| 18 | B | 142 | 0.018 | 1.0 | 10 | 70 | 15 | 0.83 | 0.14 |
| 19 | B | 147 | 0.015 | 1.0 | 10 | 70 | 15 | 0.60 | 0.08 |
| 20 | B | 147 | 0.015 | 0.5 | 0 | 70 | 13 | 0.52 | 0.24 |
| 21 | B | 148 | 0.018 | | | | | | |
| 22 | B | 150 | 0.025 | | | | | | |
| 23 | B | 153 | 0.045 | | | | | | |
| 24 | B | 154 | 0.022 | | | | | | |
| 25 | C | 125 | 0.067 | 0.8 | 14 | 70 | 64 | 3.12 | 0.16 |
| 26 | C | 125 | 0.067 | 0.3 | 10 | 70 | 60 | 2.41 | 0.39 |
| 27 | C | 128 | 0.036 | 0.5 | 25 | 70 | 34 | 1.20 | 0.34 |
| 28 | C | 135 | 0.022 | 0.3 | 10 | 70 | 19 | 0.57 | 0.37 |
| 29 | C | 138 | 0.018 | 0.8 | 10 | 70 | 15 | 0.46 | 0.12 |
| 30 | C | 138 | 0.018 | 0 | 0 | 70 | 15 | 0.42 | 0.37 |
| 31 | C | 129 | 0.040 | 1.0 | 10 | 70 | 40 | 1.68 | 0.17 |

Also, for the moldings 13–16, the aging temperature is varied, and the relationship between the aging time at each aging temperature and the shrinkage of the molding volume relative to the inner volume of the cavity (after aging, the molding is taken out under room temperature, and th r dimensions are measured 20 hours later) is determined as shown by the graph in FIG. 3.

Furthermore, when enhancing mold reproducibility or shortening of the aging time, an aging temperature of 80° C. is preferred. However, too high a temperature, for example, is not desirable, because shrinkage of the molding will occur.

From FIG. 4, it can be seen that when the relationship between the density (D) [Kg/m³] and the compression strength (stress necessary for 25% compression of said molding) (F) [Kg/cm²] are represented in terms of the logarithmic coordinate points (D), (F), the foam moldings that have a water absorption of less than 0.2 vol % lie within the parallelogram formed by linking the coordinate points α(15, 0.46), β(15, 0.83), γ(100, 5.87) and δ(100, 9.77).

EXAMPLE 4, COMPARATIVE EXAMPLE 4

For the foam molding of molding number 14 prepared in Example 3, heat resistant creep, heat resistant deterioration characteristic, heat resistant dimensional stability and retentivity with a lapse of time of the adiabatic performance are measured, and the results are listed in Table 5 together with the densities, compression strengths and water absorptions of the foam moldings of the molding numbers 6, 8, 14 and 19.

The above measured results are also shown in FIGS. 5, 6, 7 and 9, respectively, and the relationship between the density and compression strength as shown by the graph in FIG. 10.

The foam moldings marked with VI are the foam moldings of the present invention.

Furthermore, for comparative purpose, an in-mold foam molding of a crosslinked polyethylene resin is prepared as described below according to the method for the preparation of molding No. 17 disclosed in Japanese Laid-open Patent Publication No. 70621/1982, and the various characteristics are determined similarly as described above.

That is, a low density polyethylene having a resin density of 0.930 g/cm$^3$ and a Vicat softening point of 105° C. (experimentally prepared by Asahi Kasei Kogyo Kabushiki Kaisha) is impregnated with dicumyl peroxide as the crosslinking agent and crosslinked by heating to prepare crosslinked polyethylene particles. Next, the crosslinked polyethylene particles are charged into a pressure vessel and impregnated with dichlorodifluoromethane liquid with heat to provide expandable crosslinked polyethylene particles. Subsequently, the particles were aerated at atmospheric pressure for 0–4 minutes, then charged into a foaming device, wherein steam at a pressure of 0.5 to 1.0 Kg/cm$^2$ is employed, and heated at an elevated temperature within 20 to 50 seconds, with the heating time after the temperature elevation being adjusted to 5 seconds, to obtain primarily expanded particles.

The primary foam particles are converted to expandable particles containing air by treatment in pressurized air at 10 Kg/cm$^2$ at 80° C. for 6 hours, and by using steam at 0.5 to 1.0 Kg/cm$^2$, and by adjusting the heating to an elevated temperature within 20 to 50 seconds with the heating time after the temperature elevation being adjusted to 5 seconds, to secondarily expand the particles.

For the secondary foam particles, the same air impregnating foaming treatment as described above is repeated to obtain crosslinked polyethylene foam particles having foam particle densities of 0.025, 0.034 and 0.050 g/cm$^3$.

These foam particles are left to stand under atmospheric pressure for one week and, after confirming that no blowing agent and no higher pressure than atmospheric pressure are contained in the particles, the particles are charged into a pressure vessel, and air pressure is applied at normal temperature to compress the particles to 80% of their original bulk volume (compression percentage 20%). The particles are then introduced as such into a closed cavity having small perforations (inner dimensions 300×300×80 mm), followed by fusion by heating with steam at a pressure of 1.2 to 2.0 Kg/cm$^2$ for 20 to 30 seconds then, after cooling with water at about 20° C. for 30 to 60 seconds, the molding is taken from the mold and subjected to aging on a hot drying surface of 70° C. for 6 hours to obtain a foam molding.

For the foam molding obtained, density, compression strength, water absorption, heat resistant creep, heat resistant deterioration characteristic, heat resistant dimensional stability and retentivity with lapse of time of adiabatic performance are determined and the results are shown in Table 5.

Also, similarly as in Example 4, the date of respective relationships are shown by the graphs in FIGS. 5, 6, 7, 9 and 10.

The in-mold foam moldings of the crosslinked polyethylene resin are marked with VII.

As can be seen from Table 5 and FIGS. 5, 6 and 7, the foam moldings of the present invention are markedly better in heat resistant characteristics such as heat resistant creep, heat resistant deterioration characteristics and heat resistant dimensional stability, as compared with the in-mold foam moldings of the crosslinked polyethylene resin of the prior art.

TABLE 5

|  | MOLDING MARK | RESIN CHARACTERISTICS | | | | CHARACTERISTICS OF MOLDINGS | | |
|---|---|---|---|---|---|---|---|---|
|  |  | DENSITY g/cm$^3$ | $\overline{M}w \times 10^5$ | $\overline{M}w/\overline{M}m$ | NUMBER OF PEAKS | NO. | DENSITY Kg/m$^3$ | COMPRESSION STRENGTH Kg/cm$^2$ |
| EXAMPLE 4 |  | 0.952 | 4.0 | 23 | 2 | 14 | 20 | 0.85 |
|  |  |  |  |  |  | 19 | 15 | 0.60 |
|  |  |  |  |  |  | 8 | 32 | 1.50 |
|  |  |  |  |  |  | 6 | 60 | 3.45 |
| COMPARATIVE EXAMPLE 4 |  | 0.930 | 1.6 | 2.8 | 1 |  | 25 | 0.45 |
|  |  |  |  |  |  |  | 34 | 0.81 |
|  |  |  |  |  |  |  | 50 | 1.21 |

|  | MOLDING MARK | CHARACTERISTICS OF MOLDINGS | | | | |
|---|---|---|---|---|---|---|
|  |  | WATER ABSORPTION (%) | HEAT RESISTANT CREEP (%) | HEAT RESISTANT DETERIORATION (%) | DIMENSIONAL CHANGE WITH TIME ON HEATING (%) | RETENTIVITY OF ADIABATIC PERFORMANCE |
| EXAMPLE 4 |  | 0.11 | 10 | 93 | 0.4 | 1.011 |
|  |  | 0.08 |  |  |  |  |
|  |  | 0.12 |  |  |  |  |
|  |  | 0.09 |  |  |  |  |
| COMPARATIVE EXAMPLE 4 |  | 0.21 | 29 | 55 | 1 | 1.032 |
|  |  | 0.17 |  |  |  |  |
|  |  | 0.19 |  |  |  |  |

As is also clear from FIG. 9, the foam moldings of the present invention have retentivity of adiabatic performance on moisture absorption, which is equal to or better than the crosslinked product of the prior art, thus indicating that the foam moldings are excellent in the heating fusion of the foam particles.

Furthermore, FIG. 10 shows that the foam moldings of the present invention exhibit higher compression strengths in all density regions, and more highly expanded products may be available having a compression strength equal to the prior art products at a great economical advantage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Foam particles of a linear, uncrosslinked ethylenic resin which can be expansion molded by heating in its uncrosslinked state, said ethylenic resin having a molecular weight distribution of at least 15, as defined by the ratio $\overline{Mw}/\overline{Mn}$, wherein $\overline{Mw}$ is the weight average molecular weight and $\overline{Mn}$ is the number average molecular weight, as measured by gel permeation chromatography, said ethylenic resin also having a bimodal wave form in the curve of molecular weight distribution, said weight average molecular weight being at least $2 \times 10^5$ and the density of said resin being at least 0.920 g/cm$^3$, wherein said linear ethylenic resin is selected from the group consisting of a high density polyethylene, a linear low density polyethylene produced by low and medium pressure methods and a linear crystalline copolymer containing at least 50 mol % of ethylenic units.

2. The foam particles according to claim 1 wherein the linear ethylenic resin is a high density polyethylene.

3. The foam particles according to claim 1 wherein at least 60% of the cells in the particles are closed cells.

4. The foam particles according to claim 1 wherein the cells in the particles have an average size of 0.05 to 1.0 mm.

5. The foam particles according to claim 1 wherein the density of the foam particles is 15 to 100 Kg/m$^3$.

6. An in-mold foam molding of an uncrosslinked ethylenic resin, comprising as the base resin a linear ethylenic resin having a molecular weight distribution of at least 15 as defined by the ratio $\overline{Mw}/\overline{Mn}$, wherein $\overline{Mw}$ is the weight average molecular weight and $\overline{Mn}$ is the number average molecular weight as measured by gel permeation chromatography, said ethylenic resin also having a bimodal wave form in the curve of molecular weight distribution, said weight average molecular weight being at least $2 \times 10^5$ and the density of said resin being at least 0.920 g/cm$^3$ said foam molding having a density (D) (Kg/m$^3$) after molding and a stress (F) (Kg/cm$^2$) required for 25% compression of the molded product, which satisfy the relation presented by the following formula:

$$1.3 \log(D) - 1.87 \leq \log(F) \leq 1.3 \log(D) - 1.61$$

(wherein D is 15 to 100 Kg/M$^3$), said linear ethylenic resin is selected from the group consisting of a high density polyethylene, a linear low density polyethylene produced by low and medium pressure methods and a linear crystalline copolymer containing at least 50 mol % of ethylenic units.

7. The in-mold foam molding of an uncrosslinked ethylenic resin according to claim 6 comprising foam particles having a particle size of 2 to 10 mm in diameter.

8. The in-mold foam molding of an uncrosslinked ethylenic resin according to claim 6 wherein the linear ethylenic resin is a high density polyethylene.

9. The in-mold foam molding of an uncrosslinked ethylenic resin according to claim 6 wherein at least 60% of the cells in the particles are closed cells, wherein the cells in the particles have an average size of 0.05 to 1.0 mm and wherein the foam particles have a particle size of 2 to 10 mm in diameter.

* * * * *